(12) United States Patent
Binder

(10) Patent No.: US 12,134,311 B2
(45) Date of Patent: Nov. 5, 2024

(54) PROTECTION ASSEMBLY AND BATTERY HOUSING COMPRISING THE SAME

(71) Applicant: SAMSUNG SDI CO., LTD., Yongin-si (KR)

(72) Inventor: Daniel Binder, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 258 days.

(21) Appl. No.: 17/588,021

(22) Filed: Jan. 28, 2022

(65) Prior Publication Data
US 2022/0242214 A1    Aug. 4, 2022

(30) Foreign Application Priority Data

Feb. 2, 2021   (EP) .................................... 21154717
Jan. 27, 2022  (KR) ....................... 10-2022-0012707

(51) Int. Cl.
*B60K 1/04*    (2019.01)
*H01M 50/204*  (2021.01)
(Continued)

(52) U.S. Cl.
CPC ............. *B60K 1/04* (2013.01); *H01M 50/204* (2021.01); *H01M 50/242* (2021.01);
(Continued)

(58) Field of Classification Search
CPC ............. B60K 1/04; B60K 2001/0438; B60K 2220/20; H01M 50/249; H01M 50/242; H01M 50/204
(Continued)

(56) References Cited

U.S. PATENT DOCUMENTS

| | | | | |
|---|---|---|---|---|
| 5,555,950 A | * | 9/1996 | Harada ............... | H01M 50/209 180/68.5 |
| 6,068,946 A | * | 5/2000 | Zedell, Jr. .......... | H01M 50/121 429/96 |

(Continued)

FOREIGN PATENT DOCUMENTS

| | | |
|---|---|---|
| CN | 104347832 A | 2/2015 |
| CN | 104953153 A | 9/2015 |

(Continued)

OTHER PUBLICATIONS

Extended European Search Report of EP 21154717.9, Jul. 28, 2021, 7 pages.

(Continued)

*Primary Examiner* — Hau V Phan
(74) *Attorney, Agent, or Firm* — LEWIS ROCA ROTHGERBER CHRISTIE LLP

(57) ABSTRACT

A protection assembly includes: a bottom cover of a battery housing, and including a plurality of first coupling members at a first surface of the bottom cover; and a protection member below the bottom cover in a coupled state, and including a plurality of second coupling members at a second surface of the protection member. The first surface and the second surface face each other in the coupled state, and each of the second coupling members are to engage with a corresponding one of the first coupling members to mechanically connect the protection member to the bottom cover when the protection member is slid in a first direction along the bottom cover.

14 Claims, 4 Drawing Sheets

(51) Int. Cl.
*H01M 50/242* (2021.01)
*H01M 50/249* (2021.01)

(52) U.S. Cl.
CPC ... *H01M 50/249* (2021.01); *B60K 2001/0438* (2013.01); *H01M 2220/20* (2013.01)

(58) Field of Classification Search
USPC ..................................................... 180/68.5
See application file for complete search history.

(56) References Cited

U.S. PATENT DOCUMENTS

| | | | | |
|---|---|---|---|---|
| 8,469,129 | B2* | 6/2013 | Mildner | B60L 53/80 |
| | | | | 180/68.5 |
| 9,997,811 | B2* | 6/2018 | Champagne | H01M 10/6566 |
| 10,886,513 | B2* | 1/2021 | Stephens | H01M 50/224 |
| 11,211,656 | B2* | 12/2021 | Matecki | H01M 50/271 |
| 11,312,219 | B2* | 4/2022 | Klomberg | B62D 21/15 |
| 11,581,605 | B2* | 2/2023 | Eulitz | H01M 10/6556 |
| 2005/0008931 | A1 | 1/2005 | Axelrod | |
| 2014/0322562 | A1 | 10/2014 | Lee et al. | |
| 2014/0338998 | A1* | 11/2014 | Fujii | B60K 1/04 |
| | | | | 180/68.5 |
| 2015/0037619 | A1 | 2/2015 | Ahn | |
| 2017/0025655 | A1* | 1/2017 | Klimek | H01M 50/24 |
| 2017/0288185 | A1 | 10/2017 | Maguire | |
| 2018/0013111 | A1* | 1/2018 | Wuensche | H01M 50/242 |
| 2021/0119282 | A1* | 4/2021 | Wünsche | H01M 10/6568 |

FOREIGN PATENT DOCUMENTS

| | | |
|---|---|---|
| CN | 207587788 U | 7/2018 |
| CN | 209395571 U | 9/2019 |
| DE | 102011003535 A1 | 8/2012 |
| WO | WO 2019/202018 A1 | 10/2019 |

OTHER PUBLICATIONS

EPO Office Action dated Jul. 28, 2023, issued in corresponding European Patent Application No. 21154717.9 (4 pages).
Chinese Office Action for CN Application No. 202210105567.X dated Dec. 26, 2023, 18 pages.

* cited by examiner

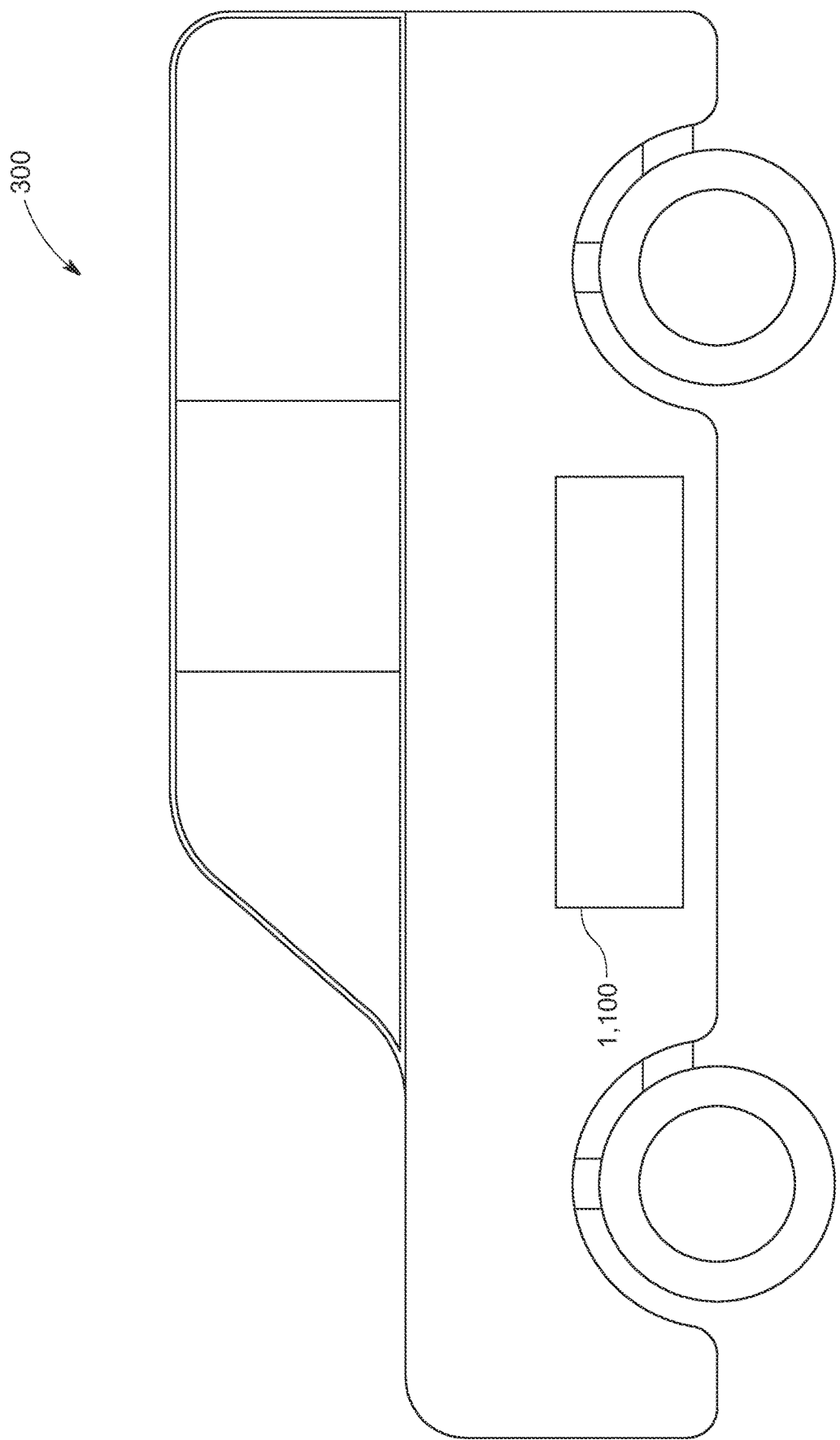

PROTECTION ASSEMBLY AND BATTERY HOUSING COMPRISING THE SAME

CROSS-REFERENCE TO RELATED APPLICATION

This application claims priority to and the benefit of European Patent Application No. 21154717.9, filed in the European Patent Office on Feb. 2, 2021, and Korean Patent Application No. 10-2022-0012707, filed in the Korean Intellectual Property Office on Jan. 27, 2022, the entire content of all of which is incorporated herein by reference.

BACKGROUND

1. Field

Aspects of one or more embodiments of the present disclosure relate to a protection assembly. Aspects of one or more embodiments of the present disclosure relate to a battery housing including the protection assembly. Aspects of one or more embodiments of the present disclosure relate to a battery system including a battery housing, and a vehicle including the battery system at an underbody part of the vehicle.

2. Description of Related Art

In the recent years, vehicles for the transportation of goods and people have been developed using electric power as a source for motion. Such an electric vehicle is an automobile that is propelled by an electric motor using energy stored in rechargeable batteries. An electric vehicle may be solely powered by batteries, or may be a form of hybrid vehicle powered by, for example, a gasoline generator. Furthermore, the vehicle may include a combination of an electric motor and a combustion engine.

In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides an irreversible conversion of chemical to electrical energy. Low-capacity rechargeable batteries are used as a power supply for small electronic devices, such as cellular phones, notebook computers, and camcorders, while high-capacity rechargeable batteries are used as the power supply for hybrid vehicles and the like.

The above information disclosed in this Background section is for enhancement of understanding of the background of the present disclosure, and therefore, it may contain information that does not constitute prior art.

SUMMARY

In general, rechargeable batteries include an electrode assembly including a positive electrode, a negative electrode, and a separator interposed between the positive and negative electrodes, a case for receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case (e.g., cylindrical, rectangular, or the like) depends on the battery's intended purpose. Lithium-ion (and similar lithium polymer) batteries, which are widely used in laptops and consumer electronics, dominate the most recent group of electric vehicles in development.

Rechargeable batteries may be used as a battery module formed of a plurality of unit battery cells that are connected in series and/or in parallel, so as to provide a high energy density, for example, for motor driving of a hybrid vehicle. In other words, the battery module may be formed by interconnecting the electrode terminals of the plurality of unit battery cells depending on a desired amount of power and in order to realize a high-power rechargeable battery.

A battery pack is a group of any suitable number of battery modules (e.g., identical battery modules). The battery modules may be configured in series, parallel, or a mixture of both, to deliver the desired voltage, capacity, and/or power density. Components of the battery pack may include the individual battery modules, and interconnects to provide electrical conductivity between the battery modules.

Mechanical integration of such a battery pack uses appropriate mechanical connections between the individual components (e.g., of the battery modules), and between the components and a supporting structure of the vehicle. These connections may remain functional and safe during the average service life of the battery system. Further, installation space and interchangeability requirements may be met, especially in mobile applications.

Mechanical integration of battery modules may be achieved by providing a carrier framework, and positioning the battery modules on the carrier framework. Fixing the battery cells or battery modules may be achieved by fitted depressions in the framework or by mechanical interconnectors, for example, such as bolts or screws. As another example, the battery modules may be confined by fastening side plates to lateral sides of the carrier framework. Further, cover plates may be fixed atop and below the battery modules.

The carrier framework of the battery pack may be mounted to a carrying structure of the vehicle. In case the battery pack is to be fixed at the bottom of the vehicle, the mechanical connection may be established from the bottom side, for example, by using bolts passing through the carrier framework of the battery pack. The framework may be made of aluminum or an aluminum alloy to lower the total weight of the construction.

Battery systems according to comparative examples, despite any modular structure, may include a battery housing that serves as an enclosure to seal the battery system against the environment, and to provide structural protection of the battery system's components. Housed battery systems may be mounted as a whole into their application environment (e.g., into an electric vehicle). Thus, the replacement of defect system parts (e.g., a defective battery submodule), requires the dismounting of the whole battery system, and removal of its housing first. Even defects of small and/or cheap system parts may then lead to dismounting and replacement of the complete battery system and its separate repair. As high-capacity battery systems are expensive, large, and heavy, such dismounting and removeable procedure may prove to be burdensome, and the storage (e.g., in a mechanic's workshop) of the bulky battery systems may be difficult or burdensome.

Housed battery systems for vehicles are often positioned at (e.g., in or on) an underbody part of the vehicle. In such a position, the battery system may be exposed to loads that can damage the battery housing and the battery components of the battery system accommodated therein.

For example, a vehicle with a battery at (e.g., in or on) an underbody part is typically lifted with a lifting jack at a position where the battery system is located. Such static load may, for example, involve forces of 10 kN that are exerted on the battery housing. In another example, an object/obstacle may be hit by the vehicle, which may result in dynamic loads with more than 100 kN that are exerted on the battery housing.

The bottom cover of the battery housing alone may not be sufficient to absorb the forces that are imposed on the battery housing and the battery system. Therefore, an additional protection member may be placed below the bottom cover of the battery housing.

However, due to the protection member, the battery housing and the internal components therein may not be reached in a practical manner. Accordingly, an exchange or repair in a common repair shop may not or may not be easily possible without opening the battery pack itself.

One or more embodiments of the present disclosure seek to solve one or more of the above problems at least to some extent. For example, according to one or more embodiments of the present disclosure, a protection assembly may be provided that may be readily assembled and disassembled, while still providing safety and stiffness to protect the battery system from mechanical loads that may damage the battery housing and/or components thereof, and which provides strong and stable coupling. However, the aspects and features of the present disclosure are not limited to those discussed above, and additional aspects and features may be realized from the description below, or may be learned by practicing one or more of the presented embodiments of the present disclosure.

According to one or more embodiments of the present disclosure, a protection assembly includes a bottom cover of a battery housing, and a protection member below the bottom cover in a coupled state. The bottom cover includes a plurality of first coupling members formed on a first surface of the bottom cover, and the protection member includes a plurality of second coupling members formed on a second surface of the protection member, the first and second surface facing each other in the coupled state. The first and second coupling members are configured to mechanically connect the protection member to the bottom cover by sliding the protection member in a first direction along the bottom cover until each of the second coupling members engages with one or more corresponding first coupling members.

In other words, the protection assembly may be a protection system. In some embodiments, the bottom cover may include a base sheet. The bottom cover may include plastic. In other words, in the coupled state, the bottom cover may be on the protection member. The first coupling members may be provided individually, and the second coupling members may be provided individually. A direction along the bottom cover may imply that the motion is lateral to the bottom cover (e.g., to the base sheet). The coupled state may be achieved when each of the first coupling members engages with its partner (e.g., a corresponding second coupling member). As used herein, the term face each other may mean oppose each other. The protection member may also include a base sheet. The protection member may include a suitable material, for example, such as steel, to provide a suitable stiffness and to absorb impact energy. In some embodiments the first and second coupling members may engage each other by hooking with each other in the coupled state. The protection member may also be referred to as an underbody protection member.

According to one or more embodiments of the present disclosure, a bottom protection system for a battery is provided that may be readily assembled. For example, the protection assembly may be readily assembled when used at (e.g., in or on) an underbody part of a vehicle, because the assembling uses a lateral movement into a first direction along the bottom cover. Therefore, a vertical space used by the protection assembly may be reduced, which may be beneficial when the protection assembly is used at (e.g., in or on) the underbody part of the vehicle. Thus, an assembly of the protection member may be performed readily in a common repair workshop. Due to the plurality of individual coupling elements, a stable coupling between the bottom cover and the protection member may be achieved due to a sum of coupling forces acting at each coupling point. The protection member may protect the battery, for example, a plurality of battery cells or a battery system that may be disposed on the bottom cover, from external loads imposed to the bottom of the bottom cover.

In some embodiments, the first and the second coupling members may be configured such that the protection member may be mechanically decoupled from the bottom cover by sliding the protection member in a second direction opposite to the first direction along the bottom cover. Accordingly, by using a reverse motion, the protection member may be readily disassembled. For example, some plastic deformation forces may merely be overcome in order to release the protection member from the bottom cover of the battery housing. The protection assembly may thus be conveniently exchanged (e.g., coupled, decoupled, re-coupled, and/or the like), while using less vertical space.

In some embodiments, at least one of the first coupling members or the second coupling members may include openings, and the other one from among the first coupling members or the second coupling members may include flaps. Each flap may engage with a corresponding opening in the coupled state. Due to the plurality of engaging flaps and openings, a stable coupled state may be achieved, which may increase safety and stability. In other words each first coupling member may include one of a flap or an opening, and each second coupling member may include the other one of the flap or the opening. Thus, a layer of a plurality of openings and a layer of a plurality of flaps may be formed at (e.g., in or on) a coupling zone between the bottom cover and the protection member.

In some embodiments, the openings may be arranged in one or more parallel or substantially parallel rows, and the flaps may be arranged in a same number of parallel or substantially parallel rows. The rows of the openings may overlap with the rows of the flaps in the coupled state. A sequence of neighboring coupling points may thus be generated to increase the coupling strength. The distance between neighboring coupling members of one row may refer to a maximum sliding distance to reach an aligned overlap of the bottom cover and the protection member. A matrix of coupling points arranged in several overlapping pairs of rows may be implemented.

In some embodiments, the openings may be formed in first cross members, and the flaps may be formed in second cross members. The first cross members may extend perpendicular to or substantially perpendicular to the second cross members in the coupled state. The cross members may readily absorb impact energy with deforming the bottom cover or the internal components of the battery housing. The perpendicular arrangement may lead to improved stiffness and improved stability. In the present context, a cross member may also include a lengthwise extension, and not only a widthwise extension. In other words, a cross member may be a cross beam.

In some embodiments, the first cross members and the second cross members may include hollow profiles. Due to the hollow profiles, impact forces may be absorbed by the cross members, which may limit the impact on the bottom cover of the housing and the battery. Thus, deformation of the battery and/or the battery housing may be prevented or reduced.

In some embodiments, the first cross members may include contact portions connected with a corresponding surface, and a protruding portion forming the hollow profile. The opening may be formed in the protruding portion, such that the corresponding flap passes through the opening and the protruding portion overlaps with the flap in the coupled state. The openings may be obtained by punching holes into the protruding portions of the first cross members. The openings may also be referred to as slots. Thus, the flap prevents or substantially prevents the protruding portion of the protection member from being released, such that the coupled state is reached by a lateral motion.

In some embodiments, the protruding portion may include a planar portion that is parallel to or substantially parallel to the corresponding surface. The flap may be formed to contact the planar portion, such that at least a part of the flap is between the planar portion and the corresponding surface in the coupled state. Vertical motion may be prevented or substantially prevented by the flap in the coupled state.

In some embodiments, the flaps in the second cross member may include a stepped portion, and a planar portion connected to the stepped portion. The planar portion may include an open side opposite to the stepped portion. The flaps may thus form a depressed portion due to the stepped portion.

In some embodiments, the second cross members may include an offset formed between the open side of the planar portion and a base portion of the second cross member. An offset may be a spaced misalignment. The spaced misalignment may allow the protruding portion to enter the offset to engage with the flap.

In some embodiments, the protruding portion of the first cross member may pass through the offset to overlap with the flap in the coupled state. Thus, the flap prevents or substantially prevents the protruding portion of the protection member from being released, such that a coupled state is achieved by a lateral motion.

In some embodiments, the first cross member may be welded to the bottom cover, and the second cross member may be welded to the protective member. Thus, the cross members may be fixed in a stable manner to the bottom cover and the protective member, respectively.

According to one or more embodiments of the present disclosure, a battery housing includes the protection assembly according to one or more embodiments.

According to one or more embodiments of the present disclosure, a battery system includes a battery housing according to one or more embodiments.

According to one or more embodiments of the present disclosure, a vehicle includes a battery system according to one or more embodiments positioned at an underbody of the vehicle.

Further aspects and features of the present disclosure may be realized from the detailed description, the figures, and the claims and their equivalents, or may be learned from practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting example embodiments with reference to the accompanying drawings, in which:

FIG. 5 schematically illustrates a vehicle according to an embodiment of the present disclosure.

DETAILED DESCRIPTION

Figure 1:
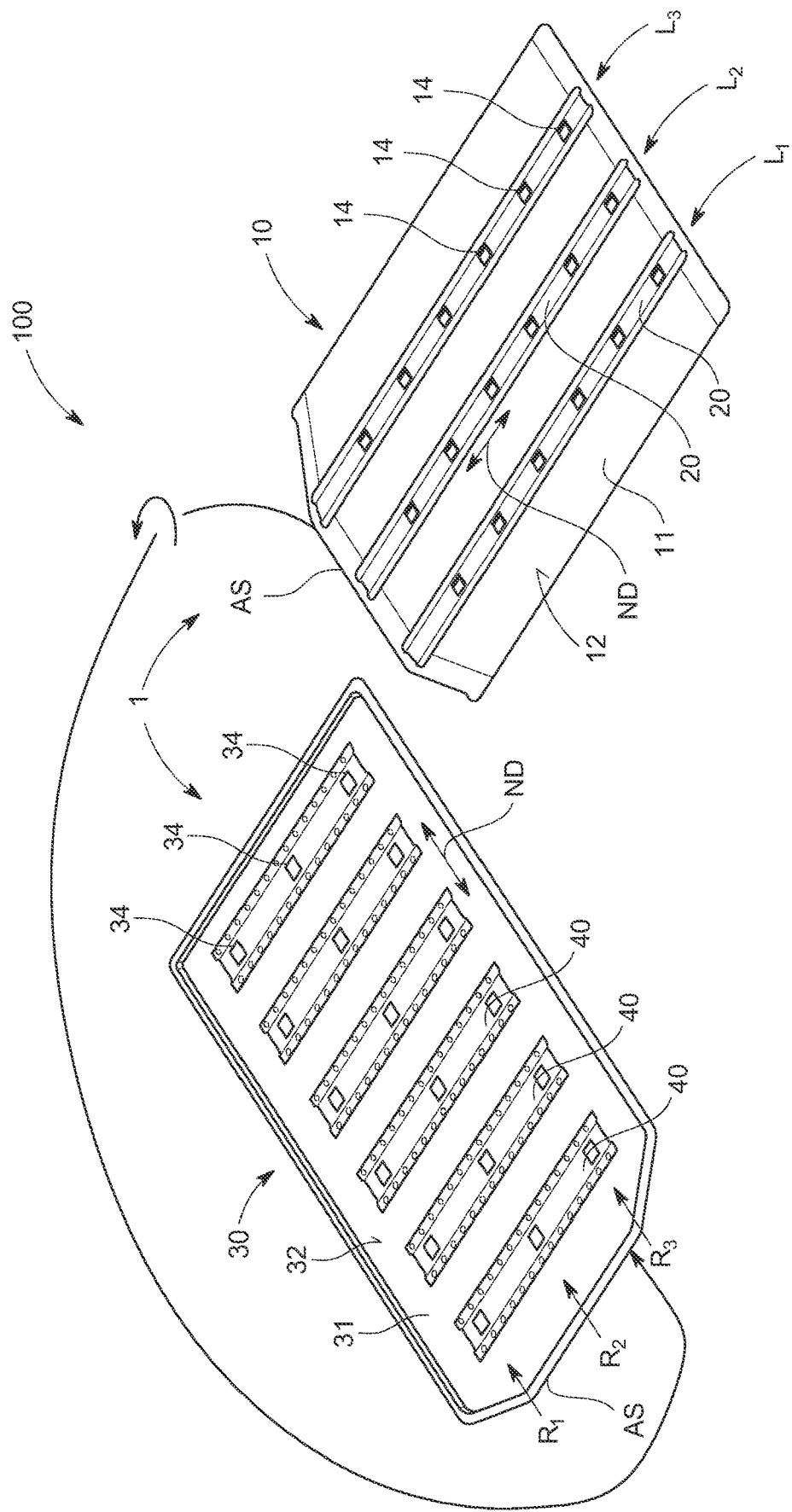
FIG. 1 illustrates a schematic view of a protection assembly in a decoupled state according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

As used herein, the terms "upper" and "lower" are defined according to the z-axis. For example, the upper cover is positioned at the upper part of the z-axis, whereas the lower cover is positioned at the lower part thereof.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "above," "on," "connected to," or "coupled to" another element or layer, it can be directly "above," on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIGS. 1-4 show various states and views of the protection assembly 1 according to one or more embodiments of the present disclosure, which will be described in parallel hereinafter by referencing particular Figures for illustration of the various aspects and features of the present disclosure.

Figure 2:
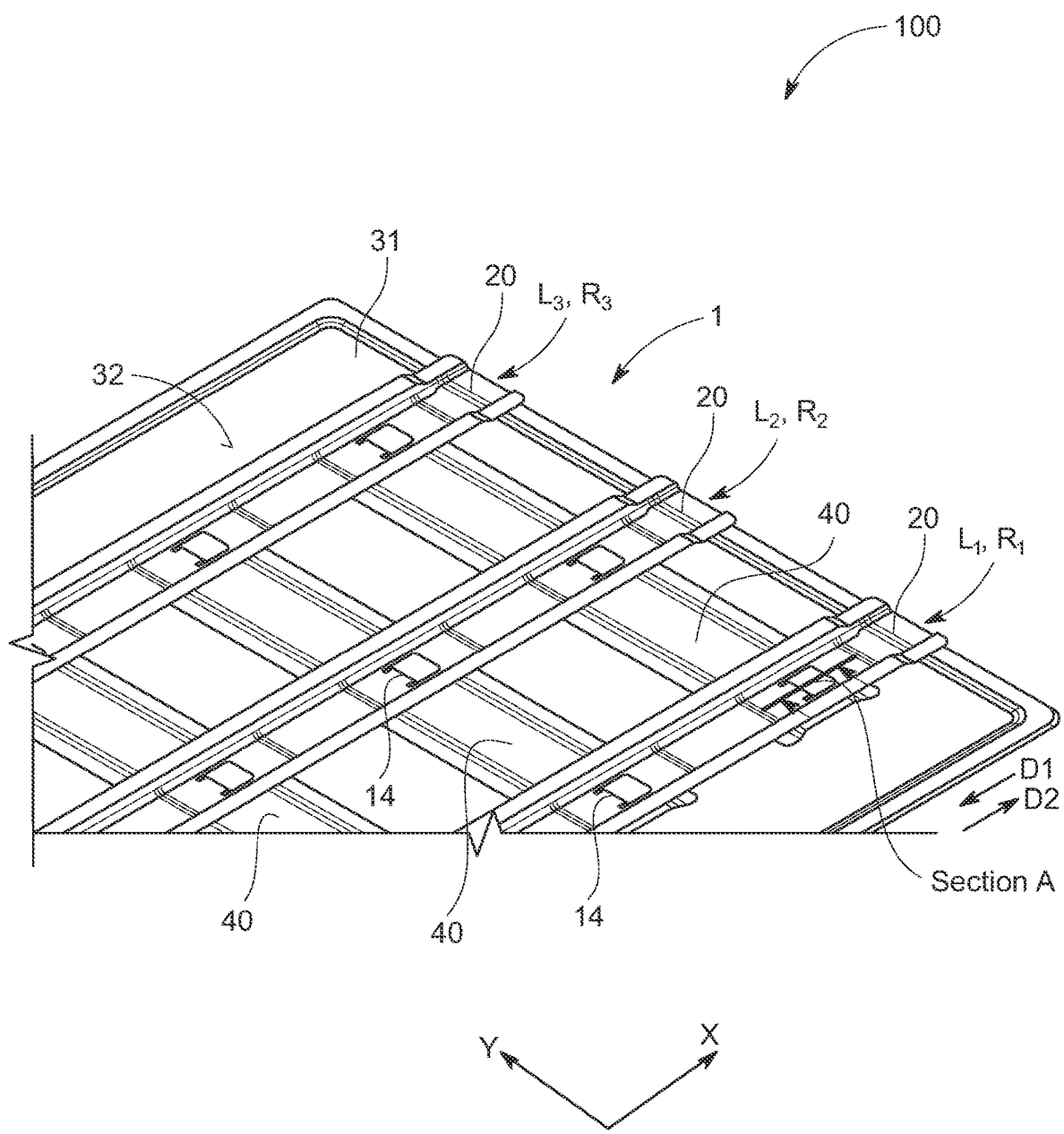
FIG. 2 illustrates a schematic top view of a protection assembly in a coupled state according to an embodiment of the present disclosure.
Figure 3:
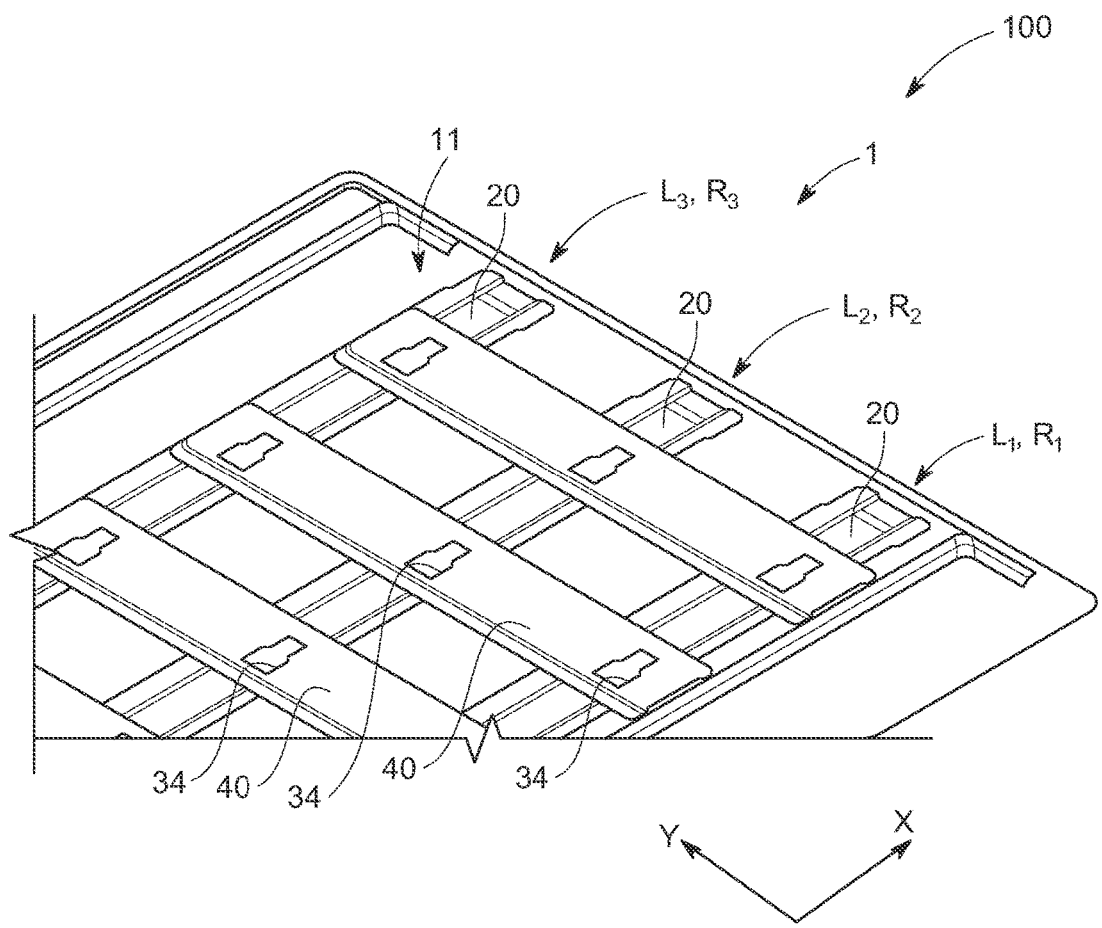
FIG. 3 illustrates a schematic bottom view of a protection assembly in a coupled state according to an embodiment of the present disclosure.
Figure 4:
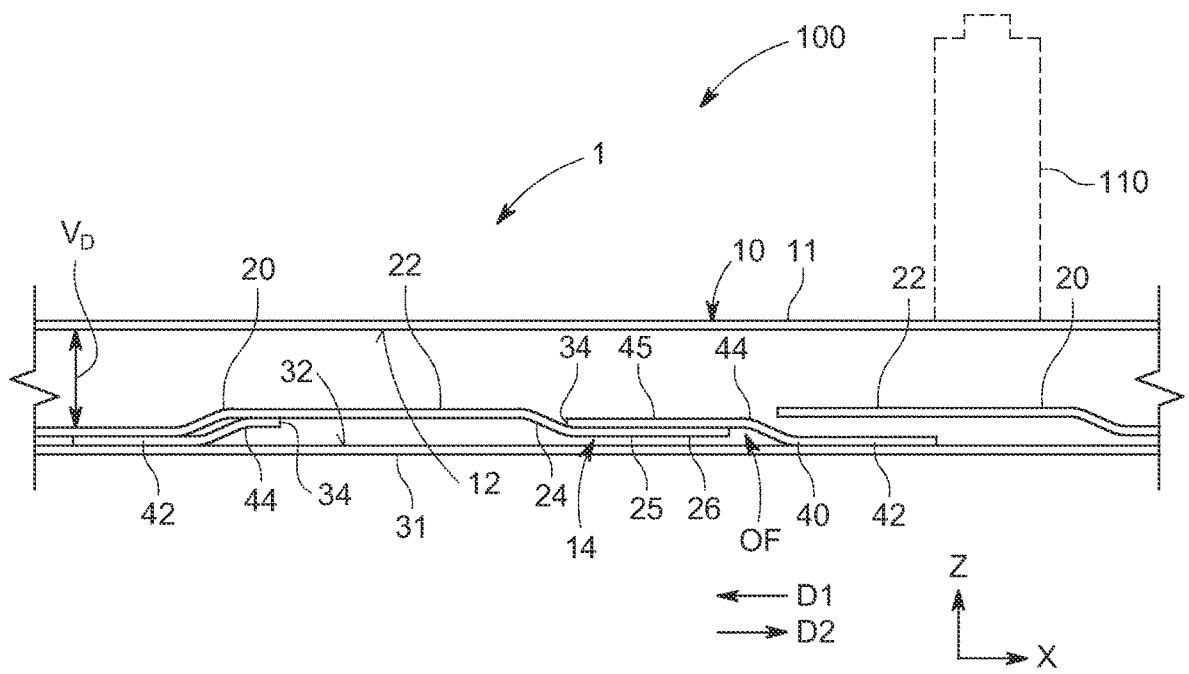
FIG. 4 illustrates a schematic cross-sectional view of a protection assembly in a coupled state taken along the section A in FIG. 2 according to an embodiment of the present disclosure.

FIG. 1 shows a schematic view of a protection assembly 1 in a decoupled state according to an embodiment of the present disclosure. FIG. 2 shows a protection assembly 1 in a coupled state according to an embodiment of the present disclosure, and may correspond to a top perspective view. In the top perspective view of FIG. 2, a base sheet 11 of a bottom cover 10 is omitted for convenience of illustration to illustrate a top perspective view of the coupling mechanism of the protection assembly 1. FIG. 3 shows a protection assembly 1 in a coupled state according to an embodiment of the present disclosure, and may correspond to a bottom perspective view. In the bottom perspective view of FIG. 3, a base sheet 31 of a protection member 30 is omitted for convenience of illustration to illustrate a bottom perspective view of the coupling mechanism of the protection assembly 1. FIG. 4 illustrates a schematic cross-sectional view of the protection assembly 1 in a coupled state taken along the section A in FIG. 2 according to an embodiment of the present disclosure, and shows the base sheet 11 of the bottom cover 10 and the base sheet 31 of the protection member 30.

FIG. 1 shows a protection assembly 1 for protecting the bottom of a battery or battery system. In FIG. 1, the protection assembly 1 is shown in the decoupled state, while in FIGS. 2-4, the protection assembly 1 is shown in the coupled state from different perspective views and/or cross-sectional views. In FIG. 1, the coupling between the protection member 30 and the bottom cover 10 to achieve the coupled state is illustrated by a schematic connecting arrow. In FIG. 1, it is further indicated that the coupled state may be achieved by flipping one of the coupling members (e.g., by flipping the bottom cover 10), such that the coupling members face each other as illustrated further below, for example, such as in FIG. 4.

The protection assembly 1 comprises a bottom cover 10. The bottom cover 10 is part of a battery housing 100. For convenience of illustration, other parts of the battery housing 100 may be omitted in FIG. 1. For example, while not shown in FIG. 1, a plurality of battery components, for example, such as battery cells 110 (e.g., see FIG. 4) and/or battery modules, a battery pack, control electronics, interfaces, a fuse, and/or the like may be disposed on the bottom cover 10 and/or accommodated by the battery housing 100. The bottom cover 10 may include a base sheet 11 (e.g., a planar or substantially planar base sheet), which forms a base substrate of the bottom cover 10. The bottom cover 10 may include, for example, a plastic material, but the present disclosure is not limited thereto.

The protection assembly 1 further includes a protection member 30. The protection member 30 is provided separately from the bottom cover 10, and thus, may be provided in the uncoupled state from the bottom cover 10 as shown in FIG. 1. FIGS. 2 to 4 show the protection assembly 1 when the bottom cover 10 and the protection member 30 are in the coupled state.

In the coupled state, as shown in the top perspective view of FIG. 2 and the cross-sectional view of FIG. 4 taken along the section A in FIG. 2, the protection member 30 is positioned below the bottom cover 10. The protection member 30 may include a base sheet 31 (e.g., a planar or substantially planar base sheet). As described above, in FIG. 2, the base sheet 11 of the bottom cover 10 is omitted for convenience of illustration to illustrate a top perspective view of the coupling mechanism between the bottom cover 10 and the protection member 30. The material of the base sheet 31 may include any suitable material to provide a suitable stiffness, and to suitably absorb the exerted loads acting on the protection member 30. For example, the material of the base sheet 31 may include steel, but the present disclosure is not limited thereto. Therefore, the protection member 30 may protect the bottom of the battery from being damaged and/or deformed due to the imposed static and dynamic loads.

The bottom cover 10 includes a plurality of first coupling members 14. The plurality of first coupling members 14 is formed on a first surface 12 of the bottom cover 10. The first coupling members 14 may be individually (e.g., independently or separately) provided from each other as illustrated in FIGS. 1 to 4. In other words, the plurality of first coupling member 14 may be spaced apart from each other.

The protection member 30 includes a plurality of second coupling members 34. The plurality of second coupling members 34 is formed on a second surface 32 of the protection member 30. The second coupling members 34 may be individually provided from each other as illustrated in FIGS. 1 to 4 (e.g., the second coupling members 34 may be spatially separated from each other). In other words, the plurality of second coupling members 34 may be spaced apart from each other.

The first and second surfaces 12 and 32 face each other when the bottom cover 10 and the protection member 30 are in the coupled state, as shown in the cross-sectional view of FIG. 4 taken along the section A in FIG. 2. In other words, the first and second coupling members 14 and 34 face each other in the coupled state. Each of the first and second coupling members 14 and 24 are formed between the base sheets 11 and 31 of the bottom cover 10 and the protection member 30, for example, as shown in FIG. 4.

From the uncoupled state shown in FIG. 1, the protection member 30 and the bottom cover 10 may be slid relative to each other into the coupled state due to features of the first and second coupling members 14 and 34 as described in more detail hereinafter. The first and second coupling members 14 and 34 may be structured such that the protection member 30 may be mechanically connected (e.g., mechanically attached to or coupled to) the bottom cover 10 by sliding the protection member 30 in a first direction D1 along the bottom cover 10. Along the bottom cover 10, there may be a lateral motion of the protection member 30 in contact with the bottom cover 10 (e.g., the base sheet 11). The sliding movement results in the coupled state when each of the second coupling members 34 engages (e.g., hooks) with a corresponding first coupling member 14. The first direction D1 (e.g., a coupling direction) is illustrated in FIGS. 2 and 4, in which the coupled state is shown. A sum of the individual coupling forces of the plurality of individual coupling members 14 and 34 may improve a coupling force.

Thus, according to one or more embodiments of the present disclosure, the protection member 30 may be assembled with the bottom cover 10 by the lateral motion. Such assembling achieved by the first and second coupling members 14 and 34 may save a vertical space, for example, when the protection assembly 1 is located at (e.g., in or on) an underbody of a vehicle. Further, the assembling of the bottom cover 10 with the protection member 30 may be conveniently fast, and may not require an advanced tool set.

The first and the second coupling members 14 and 34 may be structured such that the protection member 30 may be mechanically disconnected (e.g., mechanically unattached or decoupled) from the bottom cover 10 by sliding the protection member 30 in a second direction D2 relative to the bottom cover 10 as indicated in FIGS. 2 and 4. The second direction D2 may be opposite to the first direction D1 along the bottom cover 10. Thus, the protection member 30 may be readily exchangeable by a sliding motion, which may be performed in a common repair workshop.

In some embodiments, the first coupling members 14 of the bottom cover 10 may include (e.g., may be defined by) flaps 14. For example, each first coupling member 14 may include (e.g., may be defined by) a flap 14 as shown in FIG. 1. The second coupling members 34 may include (e.g., may be defined by) openings 34. For example, each of the second coupling members 34 may include (e.g., may be defined by) an opening 34, for example, as shown in FIGS. 1 to 4. In some embodiments, each flap 14 may engage with a corresponding opening 34 in the coupled state, for example, as shown particularly in FIG. 2. The coupling mechanism including the flaps 14 and the openings 34 may lead to stability and safety.

In another embodiment, while not explicitly shown in the figures, the openings 34 and the flaps 14 may be reversed. For example, the first coupling members 14 may include (e.g., may be defined by) openings, and the second coupling members 34 may include (e.g., may be defined by) flaps. Such symmetric structure may apply to one or more of the example embodiments described in more detail below, and may be readily understood by those skilled in the art. However, for convenience of illustration and description, the case where the first coupling members 14 include (e.g., are defined by) the flaps 14 and the second coupling members 24 include (e.g., are defined by) the openings 34 may be described in more detail hereinafter.

The openings 34 may be arranged in one or more parallel rows R1, R2, R3. While FIG. 1 shows three parallel rows R1, R2, and R3, the present disclosure is not limited thereto. The flaps 14 may be arranged in one or more parallel rows L1, L2, L3. A number of the rows L1, L2, and L3 of the flaps 14 may be the same or substantially the same as a number of the rows R1, R2, R3 of the openings 34, but the present disclosure is not limited thereto. The rows R1, R2, R3 of the openings 34 may overlap with the rows L1, L2, L3 of the flaps 14, respectively, in the coupled state, for example, as shown in FIGS. 2 and 3. Distances (e.g., neighboring distances) ND between adjacent coupling members of one row may be equidistant or substantially equidistant. The neighboring distance ND may be a maximum sliding distance used to achieve the coupled state. The protection member 30 and the bottom cover 10 may further include an atypically formed side AS, which compared to the flat sides, may improve the alignment of the protection member 30 with the bottom cover 10 to achieve the coupled state.

In some embodiments, as shown in FIGS. 1 and 2, the flaps 14 may be formed at (e.g., in or on) first cross members 20. The openings 34 may be formed in second cross members 40. The cross members 20 and 40 may include (e.g., may be made of) a metal, for example, such as steel, to provide improved impact absorbance. The first and second cross members 20 and 40 may extend to be perpendicular to or substantially perpendicular to each other in the coupled state, for example, as shown in FIG. 2. The cross members 20 and 40 may absorb impact forces, and may include the openings 34 and the flaps 14. Due to the perpendicular or substantially perpendicular array of the cross members 20 and 40 crossing each other, higher stability and impact absorbance may be provided.

The cross members 20 and 40 will be described in more detail hereinafter, in particular, with reference to FIG. 4 showing a cross-sectional view taken along the section A in FIG. 2 at a coupling point between a corresponding opening 34 and a corresponding flap 14.

The first cross members 20 and the second cross members 40 may include hollow profiles, for example, as shown in FIG. 4, to absorb impacts exerted from the bottom side. For example, a vertical distance Vo between the first cross member 20 (e.g., a base portion 22 thereof) and the base sheet 11 may be provided. A vertical space may also be provided for the second cross member 40. The second cross member 40 may include (e.g., may be made of) steel to provide stiffness against deformation.

The second cross members 40 may include contact portions 42, which are connected to the second surface 32. For example, the second cross members 40 may be welded to the second surface 32 of the protection member 30 at the contact portions 42.

The second cross members 40 may include protruding portions 44. The protruding portions 44 may form the hollow profile of the second cross members 40. In other words, a hollow space is formed below the protruding portions 44 between the protruding portions 44 and the second surface 32 (e.g., the base sheet 31).

The openings 34 may be formed in the protruding portions 44. The protruding portions 44 may thus include the openings 34. The corresponding flap 14 may pass through the corresponding opening 34, such that the protruding portion 44 overlaps with the corresponding flap 14. For example, the protruding portion 44 may be in direct contact with the corresponding flap 14 as shown in FIG. 4 in the coupled state. The overlapping protruding portions 44 are shown in the top perspective view of FIG. 2, as well as in the cross-sectional view of FIG. 4. In other words, the flap 14 may be below the protruding portion 44 in the coupled state. At the other side of the opening 34 opposite to the flap 14, the first cross member 20 may be on the protruding portion 44, for example, as shown in the left side of FIG. 4. The flap 14 and the opening 34 are thus hooked or entangled with each other. Thus, the flap 14 may prevent or substantially prevent the protruding portion 44 of the protection member 30 from being released, such that the coupled state is achieved by the sliding motion.

The protruding portion 44 may include a planar portion 45, which may be parallel to or substantially parallel to the second surface 32 (e.g., the base sheet 31 of the protection member 30) in the coupled state. The flap 14 may be formed to contact the planar portion 45 from below, for example, as shown in the bottom perspective view of FIG. 3, as well as in the cross-sectional view of FIG. 4. Accordingly, at least a part of the flap 14 is positioned between the planar portion 45 and the second surface 32 in the coupled state.

The flaps 14 of the first cross member 20 may include a stepped portion 24. The stepped portion 24 may be stepped with respect to the base portion 22 (e.g., the planar base portion) of the first cross member 20. The flaps 14 may further include a planar portion 25 connected to (e.g., extending from) the stepped portion 24. The planar portion 25 may be parallel to or substantially parallel to the base portion 22. The planar portion 25 may include an open side 26. The open side 46 may be opposite to the stepped portion 24. The stepped portion 24 may be stepped with respect to the base portion 22 towards the opposite (e.g., the second) surface 32.

The first cross members 20 may include an offset OF, which may be a misalignment, for example, vertically and/or laterally. The offset OF may be formed between the open side 26 of the planar portion 25 of the flap 14 and the base portion 22 of the first cross member 20.

The protruding portion 44, for example, the planar portion 45, of the second cross member 40 may pass through the offset OF to overlap with the flap 14 in the coupled state. By sliding along the first direction D1, the protruding portion 44 may pass through the offset OF formed by the flap 14. Thus, the flap 14 prevents or substantially prevents the protruding portion 44 of the protection member 30 from being released to achieve the coupled state. The flap 14 may be in direct contact with the protruding portion 44. Accordingly, an entangled or hooked structure of the protruding portions 44, the openings 34, and the flaps 14 is created in the coupled state according to one or more embodiments of the present disclosure.

For decoupling the protection member 30, the protruding portion 44 may be slid in the second direction D2 through the offset OF to achieve the decoupled state. In some embodiments, the first cross members 20 may be welded to the protective member 30.

In some embodiments, a screw connection may be further provided to stabilize the coupled state. For example, the screw connection may be provided at a portion at which the first and second cross members 20 and 40 contact each other at a contact portion 42 (e.g., see FIG. 4). However, even in this case, due to the mechanical coupling described above, the number of screws may be reduced or the screw connection may even be entirely omitted.

One or more embodiments of the present disclosure are also directed to a battery housing 100 including the protection assembly 1. For example, the battery housing 100 may be configured to accommodate a plurality of battery cells 110 disposed on the bottom cover 10. An example battery cell 110 of a plurality of battery cells is schematically illustrated in FIG. 4. Further, in some embodiments, a battery system may be provided including the battery housing 100.

FIG. 5 shows a vehicle according to an embodiment of the present disclosure. The vehicle 300 includes a battery system positioned at (e.g., in or on) an underbody of the vehicle 300. The battery system may include a battery housing 100 according to one or more embodiments of the present disclosure. The protection member 30 of the protection assembly 1 of the battery housing 100 may be readily exchangeable by a lateral motion as described above.

Although some embodiments have been described, those skilled in the art will readily appreciate that various modifications are possible in the embodiments without departing from the spirit and scope of the present disclosure. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

REFERENCE SYMBOLS 1 protection assembly
10 bottom cover
11 base sheet
12 first surface
14 flap
20 first cross members
22 base portion
24 stepped portion
25 planar portion
26 open side
30 protection member
31 base sheet
32 second surface
34 opening
40 second cross members
42 contact portion
44 protruding portion
45 planar portion
L1, L2, L3 first row
R1, R2, R3 second row
D1 first direction
D2 second direction
VD vertical distance
ND neighboring distance
OF offset
AS atypical side
100 battery housing
110 battery cell
300 vehicle

What is claimed is:

1. A protection assembly, comprising:
a bottom cover of a battery housing, and comprising a plurality of first coupling members at a first surface of the bottom cover; and
a protection member below the bottom cover in a coupled state, and comprising a plurality of second coupling members at a second surface of the protection member,
wherein the first surface and the second surface face each other in the coupled state,
wherein each of the second coupling members are configured to engage with a corresponding one of the first coupling members to mechanically couple the protection member to the bottom cover when the protection member is slid in a first direction along the bottom cover,
wherein one of the first coupling members or the second coupling members comprise openings, and another of the first coupling members or the second coupling members comprise flaps, and
wherein each flap is configured to engage with a corresponding opening in the coupled state.

2. The protection assembly of claim 1, wherein the first and the second coupling members are configured to mechanically decouple the protection member from the bottom cover when the protection member is slid in a second direction opposite to the first direction along the bottom cover.

3. The protection assembly of claim 1, wherein the openings are located in one or more parallel rows, and the flaps are located in one or more parallel rows in the same number of rows as that of the openings, and
wherein the rows of the openings overlap with the rows of the flaps in the coupled state.

4. The protection assembly of claim 1, wherein the flaps are located at first cross members, and the openings are located at second cross members, the first cross members and the second cross members extending perpendicular to each other in the coupled state.

5. The protection assembly of claim 4, wherein the first cross members and the second cross members comprise hollow profiles.

6. The protection assembly of claim 5, wherein the second cross members comprise contact portions connected to a corresponding surface, and protruding portions forming the hollow profile of the second cross members, and
wherein the openings are located in the protruding portions such that the flaps pass through the openings and the protruding portions overlap with the flaps in the coupled state.

7. The protection assembly of claim 6, wherein each of the protruding portions comprises a planar portion that is parallel to the corresponding surface, and
wherein a corresponding flap of the flaps contacts the planar portion such that at least a part of the corresponding flap is between the planar portion and the corresponding surface in the coupled state.

8. The protection assembly of claim 5, wherein each of the flaps of the first cross members comprises a stepped portion, and a planar portion connected to the stepped portion, the planar portion having an open side opposite to the stepped portion.

9. The protection assembly of claim 8, wherein each of the first cross members comprises an offset between the open side of the planar portion and a base portion of a corresponding one of the first cross members.

10. The protection assembly of claim 9, wherein protruding portions of the second cross members pass through the offsets of the first cross members to overlap with the flaps in the coupled state.

11. The protection assembly of claim 4, wherein the first cross members are welded to the bottom cover, and the second cross members are welded to the protective member.

12. A battery housing comprising the protection assembly according to claim 1.

13. A battery system comprising the battery housing according to claim 12.

14. A vehicle comprising the battery system according to claim 13 located at an underbody of the vehicle.

* * * * *